(12) United States Patent
Schutt-Aine et al.

(10) Patent No.: US 8,056,034 B1
(45) Date of Patent: Nov. 8, 2011

(54) USE OF SMITH CHART TO COMPENSATE FOR MISSING DATA ON NETWORK PERFORMANCE AT LOWER FREQUENCY

(75) Inventors: Jose Schutt-Aine, Savoy, IL (US); Jilin Tan, Nashua, NH (US); Chidhambarakrishnan Kumar, Medford, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 919 days.

(21) Appl. No.: 12/016,151

(22) Filed: Jan. 17, 2008

(51) Int. Cl.
*G06F 17/50* (2006.01)
(52) U.S. Cl. ......... 716/113; 716/101; 716/126; 716/132
(58) Field of Classification Search .................. 716/101, 716/113, 126, 132
See application file for complete search history.

(56) References Cited

U.S. PATENT DOCUMENTS 7,582,182 B2 * 9/2009 Matsumoto et al. ..... 156/345.24

OTHER PUBLICATIONS

Nelson, Rick "How does a Smith chart work?", in Test & Measurement World, Jun. 1, 2001 (corrected Mar. 7, 2006), Reed Business Information, a division of Reed Elsevier Inc., Waltham, Massachusetts, U.S.A.

* cited by examiner

*Primary Examiner* — Thuan Do
(74) *Attorney, Agent, or Firm* — Schwegman, Lundberg & Woessner, P.A.

(57) ABSTRACT

A method is provided to use a Smith Chart technique to obtain frequency domain network performance information corresponding to a passive network including one or more passive devices comprising: receiving first data representing a first Smith Chart plot of coefficients representing measured mismatch between a source impedance of a network and a load impedance of the network for higher frequency components; and extrapolating a predicted substantially spiral shaped second Smith Chart plot of coefficients based upon the first data, which includes a coefficient representing predicted mismatch between the source impedance of the network and the load impedance of the network for lower frequency components.

23 Claims, 6 Drawing Sheets

USE OF SMITH CHART TO COMPENSATE FOR MISSING DATA ON NETWORK PERFORMANCE AT LOWER FREQUENCY

BACKGROUND OF THE INVENTION

1. Field of the Invention

The invention relates in general to characterization of frequency dependent behavior of a passive electrical network and more particularly, the use of a Smith Chart to evaluate frequency dependent behavior at lower frequencies.

2. Description of the Related Art

The behavior of electrical networks consisting of passive linear devices such as, connectors, cables, micro strip lines and printed circuit boards may be frequency dependent. Characterization involves measurement of a network's response to excitation by signals at different frequencies. One measure of the frequency response of a network is its complex coefficient, which can be defined in terms of a ratio between a reflected voltage wave and an incident voltage wave. Typically, a network will manifest different coefficient values in response to excitation by signals at different frequencies.

FIG. 1 is an illustrative drawing showing an incident voltage $V_{inc}$ and reflected voltage $V_{refl}$ in a network comprising a transmission line having characteristic impedance $Z_0$ and a load having load impedance $Z_L$. Impedance of a component or circuit is a measure of the component's or circuit's opposition to a sinusoidal alternating electric source. The coefficient (called Gamma and symbolized by Γ) is defined as, $$\Gamma_L = V_{refl}/V_{inc} = Z_L - Z_0/Z_L + Z_0 = \Gamma_r + j\Gamma_i.$$

The amount of reflected signal from a load to the source is dependent upon the degree of mismatch between characteristic impedance and load impedance. Matching of characteristic impedance and load impedance avoids reflection of energy back from the load to the source. Specifically, to obtain the maximum power transfer from a source to a load, the characteristic impedance should be equal to the complex conjugate of the load impedance. In higher frequency environments such as video lines, RF and microwave networks, for example, spurious elements like wire inductances, interlayer capacitances and conductor resistances can have a significant yet unpredictable impact upon impedance matching. As a result, theoretical calculations and simulations may be insufficient to predict frequency dependent device behavior. Accordingly, actual measurements of device behavior at different excitation frequencies are obtained to characterize frequency dependency.

Characterization of passive devices or networks of passive devices over a range of different frequencies results in a frequency domain signature for the devices or the network of devices. Signal processing techniques can be used to predict network behavior in the time domain from a device frequency signature based on the frequency domain signature. For instance, the inverse Fourier transform often is used to obtain the time-domain response of circuits and systems from measured frequency-domain data. In order for the Fourier transform to function properly, however, information throughout the entire spectrum should be provided. Theoretically, this spectrum spans from DC (zero frequency) to infinity. In reality, since the Fourier process is discretized and the data is truncated, the highest frequency information is considered as infinite frequency data. In general, the inverse fast Fourier transform (IFFT) algorithm expects to receive a frequency domain signature that comprises a list of data points corresponding to uniformly spaced frequency points the first of which will be considered as DC and the last of which will be treated as infinite frequency. Therefore, the Fourier transform algorithm ordinarily treats the first measured data point as the DC (zero frequency) information. If the first data point in the list (which corresponds to the lowest measured frequency) is not an actual DC point, then there can be serious inaccuracies in the inverse transform process.

Unfortunately, in many cases, the lowest frequency at which measured data points are available is much higher than DC. Current state-of-the-art equipment measurement equipment typically can provide network parameter data at frequencies no lower than about 45 MHz. For instance, data from systems characterized with a standard HP8510C/110 GHz Network Analyzer ordinarily do not contain information for frequencies below 45 MHz. For RF and Microwave applications, this is in general not a problem. For signal integrity analysis on digital PCB/Packaging, however, it can be a serious problem since the digital spectrum is broadband, from DC to daylight, and the DC value of the network parameter is critical to the correctness of entire transient waveforms in time domain.

In the past, extrapolation techniques have been used to compensate for missing low frequency signal measurement information. However, these prior methods generally assume that certain data points are relatively close to DC. The correctness of the extrapolated data obtained through these algorithms depends at least in part upon the assumption that certain data points are close to DC, and in many cases that assumption may not be accurate.

For example, one prior approach is to use a measurement value obtained for the lowest measured frequency as if it was the DC frequency value. Unfortunately this can be an inaccurate approximation of the DC value. For instance, the accuracy of DC measurement data may be diminished if the lowest frequency is beyond the onset of the skin effect region. Another prior approach is to extrapolate the magnitude and phase of a network parameter separately. Still another approach is to extrapolate the real and imaginary parts of the parameter separately. These latter two approaches assume that the DC value can be linearly extrapolated from the last two measured data values. However, the validity of this assumption is case dependent. It depends on the specific structures (e.g., simple uniform transmission line or 3D discontinuity structures) and the range of missing frequency data at low frequency end.

Thus, there has been a need for improvement in the acquisition of information concerning low frequency behavior of a network. In particular, there has been a need for improvement in the acquisition of information concerning the behavior of networks at frequencies below the frequency at which behavior ordinarily can be measured using typical measurement equipment. The present invention meets these needs.

SUMMARY OF THE INVENTION

In accordance with an aspect of the invention, a Smith Chart technique is used to obtain frequency domain network performance information corresponding to a passive network including one or more passive devices. Measured data is obtained that represents a first Smith Chart plot of coefficients representing measured mismatch between a source impedance of a network and a load impedance of the network for each of multiple different higher frequency signals. At least a portion of a spiral path is extrapolated based upon the measured data representing the Smith Chart plot. The extrapolated portion represents a second Smith Chart plot that includes a coefficient representing predicted mismatch between the source impedance of the network and the load impedance of the network predicted for lower frequency signals.

Therefore, a Smith Chart technique uses measured high frequency data that can be more readily acquired, to predict lower frequency data that can not be measured so readily.

These and other features and advantages of the invention will be appreciated from the following more detailed description of embodiments of the invention in conjunction with the appended drawings.

DETAILED DESCRIPTION OF THE PREFERRED EMBODIMENTS

Figure 1:
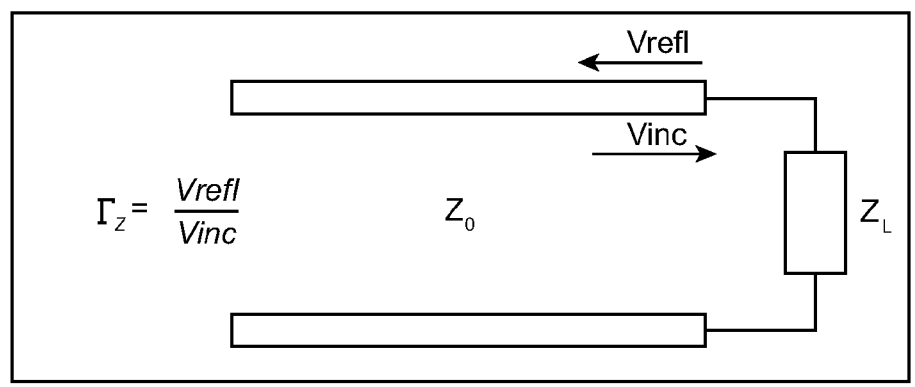
FIG. 1 is an illustrative graphical drawing showing an incident voltage and reflected voltage in a network comprising a transmission line having source impedance and a load having load impedance.

The following description is presented to enable any person skilled in the art to make and use a computer implemented method and apparatus to use a Smith Chart to estimate lower frequency performance information for a network in accordance with embodiments of the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

Terminology

The following terminology is used within this specification.

Network: a set of electrical circuits. It may include a set of sub-circuits, lumped electrical and electronic devices. It also may include distributed electrical devices. Those devices are connected to exhibit a desired electrical behavior.

Impedance: the ratio of voltage over current

Device: an instrumentality having a particular purpose in a circuit.

N-port device: a device that has N different connections in a circuit.

Electrical Device: a device that accomplishes its purpose electronically.

Network Parameters: electrical parameters used to characterize the electrical network. For an example, the scattering parameters (S parameter), the admittance parameters (Y parameter) and the impedance parameters (Z parameter).

Complex Coefficient: a signal is divided into incident and reflected (or scattered) components. The ratio of the reflected signal component over the incident.

S-parameter: scattering parameter. A signal is divided into incident and reflected (or scattered) components. The ratios of reflected or transmitted component over the incident with proper normalization are the components of S parameter. For example, S11 is the ratio of reflected signal from port 1 when sending signal in from port 1. It is the same as the complex coefficient. S parameters are convenient for use at higher frequencies.

Passivity: a property of networks to be passive i.e. not to generate energy. A passive network lets out less power than comes into it.

Causality: a property of a system by which the cause must precede the effect

DC: direct current. It also means zero frequency.

Frequency Domain: a term that is used to describe the analysis of mathematical functions with respect to frequency Smith Chart: a coordinate system in which both the impedance and coefficients can be represented and plotted as a function of frequency. An S parameter, such as the S11, will be plotted on the Chart in the same way as for the coefficients.

Transient Analysis: a procedure that allows one to determine the behavior of a signal while the cause of the signal is itself undergoing transition.

Time Domain: a style in which the response due to an excitation is represented. In the time domain, voltage and current quantities are expressed or displayed as a function of time. In this case, time is the independent variable.

Smith Chart Basics

Smith Chart techniques have been extensively used by microwave and RF engineers for several decades. These techniques involve a mapping of the network parameters of a circuit in a polar graphical format. One of its most important properties is that it can be used to monitor the passivity and causality of networks under study. For instance, Foster's reaction theorem dictates a general motion in the clockwise direction with frequency for the parameters of an arbitrary network.

For every passive device with impedance Z, there is an associated coefficient $\Gamma$. The relationship between impedance and coefficient is given by:

$$Z(z) = Z_o \left[ \frac{1 + \Gamma(z)}{1 - \Gamma(z)} \right] \quad (1)$$

where $Z_o$ is the characteristic impedance of the electrical system (which can be a device, or collection of electrically connected devices called a network). The normalized impedance is $$Z_n(z) = \frac{1 + \Gamma(z)}{1 - \Gamma(z)} = \frac{1 + \Gamma}{1 - \Gamma} \quad (2)$$

The coefficient and the normalized impedance have the form:

$$\Gamma = \Gamma_r + j\Gamma_i \quad (3)$$

and $$Z_n = r + jx \quad (4)$$

Therefore, if we use the coefficient complex plane as a reference, (with $\Gamma_r$ (real component) as the horizontal axis and $\Gamma_i$ (imaginary component) as the vertical axis), we can then represent the impedance plane on the coefficient plane.

Figure 2:
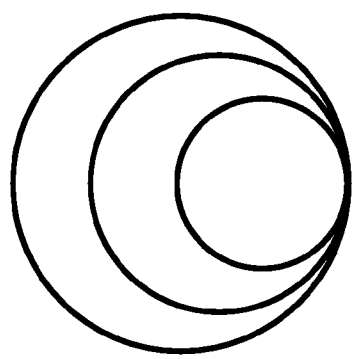
FIG. 2 is an illustrative drawing of normalized constant resistance contour plots of a Smith Chart.

FIG. 2 is an illustrative drawing of normalized constant resistance contour plots of a Smith Chart. Each constant resistance contour plot consists of a circle. Each circle represents a family of points of constant resistance in the complex reflection-coefficient plane. The centers of all of these circles lie on the same horizontal axis. The circle for a given value of r (normalized resistance) is derived as follows.

$$\Gamma_r^2 + \Gamma_i^2 - \frac{2r\Gamma_r}{1+r} + \frac{r^2}{(1+r)^2} = \quad (5)$$

$$\frac{1-r}{1+r} + \frac{r^2}{(1+r)^2} \left( \Gamma_r - \frac{r}{1+r} \right)^2 + \Gamma_i^2 = \frac{1}{(1+r)^2}$$

Equation (5) is the equation that describes the circles of FIG. 2, centered at $$\left( \frac{r}{1+r}, 0 \right)$$

and of radius $$\frac{1}{1+r}$$

Figure 3:
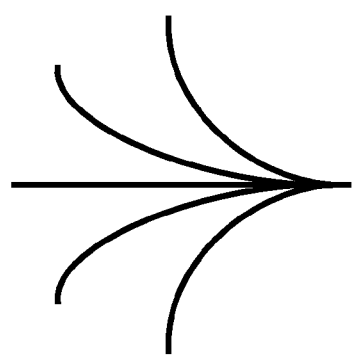
FIG. 3 is an illustrative drawing of normalized constant imaginary load impedance arcs of a Smith Chart.

FIG. 3 is an illustrative drawing of normalized constant imaginary load impedance arcs of a Smith Chart. Each constant imaginary impedance arc comprises a segment of a circle. Segments lying above the horizontal line represent inductive reactances. Segments lying below the horizontal line represent capacitive reactances. Segments for a given value of x (normalized reactance) are derived as follows.

$$\Gamma_r^2 - 2\Gamma_r + 1 + \Gamma_i^2 - \frac{2\Gamma_i}{x} + \frac{1}{x^2} = \frac{1}{x^2} - 1 + 1(\Gamma_r - 1)^2 + \left( \Gamma_i - \frac{1}{x} \right)^2 = \frac{1}{x^2} \quad (6)$$

Equation (6) is the equation that describes the arc segments in FIG. 3 that are part of a circle centered at, $$\left( 1, \frac{1}{x} \right)$$

of radius $$\frac{1}{x} \quad (7)$$

Figure 4:
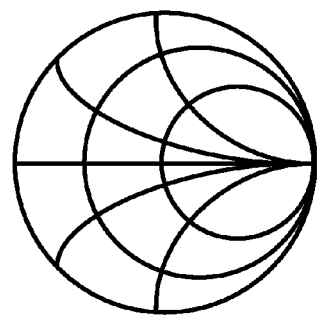
FIG. 4 is an illustrative drawing of a Smith Chart which comprises the circles of FIG. 2 and the arc segments of FIG. 3 lying within a circle with |r|=1 in the complex reflection-coefficient plane.

FIG. 4 is an illustrative drawing of a Smith Chart, which comprises the circles of FIG. 2 and the segments of FIG. 3 lying within a circle with $|r|=1$ in the complex reflection-coefficient plane. The coefficient is given by, $$\Gamma = \frac{Z_n - 1}{Z_n + 1} = \frac{r - 1 + jx}{r + 1 + jx} \quad (8)$$

We also have $$|\Gamma| = \left[ \frac{(r-1)^2 + x^2}{(r+1)^2 + x^2} \right]^{1/2} \leq 1 \quad (9)$$

Thus, the Smith Chart can be used to represent a passive network with impedance Z (normalized $Z/Z_o$) in two different ways. First, the arc and circle coordinates of the Smith Chart can be used to locate normalized device impedance. Second, a polar coordinate system associated with the Smith Chart normalized device impedance can be used to locate the reflection and the transmission.

Scattering parameters of passive networks are represented in the Smith Chart. The Smith Chart is a polar plot of the voltage coefficient, $\Gamma$. If $\Gamma$ is expressed in polar form as $|\Gamma|\exp(j\,\theta)$, the magnitude is plotted as a radius ($|\Gamma|<1$) from the center of the chart and the angle $\theta$ is measured from the right-hand side of the horizontal diameter. Any passively realizable coefficient can then be plotted as a unique point on the Smith Chart.

One aspect of the usefulness of the Smith Chart is conversion from coefficients to normalized impedances and vice versa, using the impedance circles on the chart. Measurement of scattering parameters as a function of frequency can thus be directly plotted on the Smith Chart and indicate frequency variations.

Spiral Extrapolation to Locate Lower Frequency Information

In accordance with some aspects of the invention, a spiral pattern extrapolation technique is employed to estimate scattering behavior information for a passive electrical device or network at lower frequencies beyond the ordinary capabilities typical measurement equipment. As explained above, in order to accurately characterize a device, S-parameter data should be provided down to DC. Unfortunately, in many cases the lowest frequency at which data points are available is much higher than DC.

In general, passive networks have properties of passivity, stability, causality and realness. This means that network behavior is somewhat predictable. Building upon this observation, the inventors take note of several properties of scattering parameters as viewed on the Smith Chart.

First, S-parameters of passive n-port electrical devices have magnitudes less than one and therefore must remain inside of the Smith Chart.

Second, on the Smith Chart, S parameters follow the general pattern of growing or decaying spirals with increasing frequency. In addition, these spirals move in the clockwise direction with increasing frequency (as a consequence of Foster's reaction theorem). Note that Y parameter information can be mathematically converted to S parameter information.

Third, at DC, an S-parameter value must be real and thus must be on the horizontal axis in the Smith chart.

Thus, the inventors perceived of the general behavior of:

$$\tilde{S}(f) = r_0 e^{j\theta} + re^{\pm f\alpha} e^{-j2\pi f\tau} = S_0 + S(f) \quad (10)$$

where we split the original S parameter $\tilde{S}(f)$ into frequency independent part $S_0$ and frequency dependent part $S(f)$. The inventors further realized that for the low-frequency behavior of an S parameter on the Smith Chart, they should be able to extrapolate its values to frequencies down to DC using the constraints stated above. The variable $\alpha$ and the variable $\tau$ and the variable $\theta$ together defines the shape a particular spiral curve mathematically which the S parameter obeys.

Thus, the inventors have developed techniques to utilize microwave theory represented by a Smith Chart to compensate for frequency data that for actual passive electrical devices (or network of passive devices), cannot be readily measured using available test equipment. Briefly stated, techniques in accordance with embodiments of the invention determine the curvature of a first plot on a Smith Chart of measured S parameter data points for an actual passive device (or network of passive devices) with the assumption that the first plot has a generally spiral shape. The curvature information is used to extend the spiral shape on the Smith Chart in a direction of decreasing frequency to produce a second plot comprising one or more predicted S parameter data points for the actual passive device or network.

More specifically, curvature information is determined for a first plot of measured data points on the Smith Chart. Based upon the above observations, the inventors assume that the first plot is a portion of a generally spiral shaped curve on the Smith chart, and the determined curvature information describes the shape of that spiral curve of which the first plot is a part. The determined curvature information then is used to extrapolate from the first plot to produce a second plot of one or more extrapolated data points to fill-in missing frequency data. The sought-after second plot also is a portion of the spiral curve of which the first plot is a part.

The following sections describe two alternative methods to use a spiral curve approximation to compensate for missing frequency domain information. The approximated spiral extrapolation method is better suited for passive electrical devices and networks that behave as low pass filters. The more precise extrapolation method better suited for more complex devices and networks.

Approximated Spiral Extrapolation

In accordance with some embodiments of the invention, the behavior of an electrical system such as a passive electrical device or a passive network of n-ports at low frequencies is approximated to equation (10) by assuming $r_o=0$ and $r=1$. The formula then becomes $$S(f) = e^{\pm f\alpha} e^{-j2\pi f\tau} \quad (11)$$

$\alpha$ and $\tau$ can be obtained from measurements by using the relations:

$$\alpha = \pm \frac{\ln(|S(f_1)|)}{f_1} \quad (12)$$

$$\tau = -\frac{\angle S(f)}{2\pi f_1} \quad (13)$$

This method assumes that the low frequency value of the scattering parameter is close to unity.

More Precise Spiral Extrapolation

In accordance with some embodiments a more precise approach is taken to approximating the behavior of an electrical system such as a passive electrical device or a passive network of n-ports at low frequencies. In accordance with this more precise method, equation (10) is rewritten as:

$$S(f) = A + re^{-\gamma f} \quad (14)$$

where $$\gamma = \alpha + j2\pi\tau \quad (15)$$

If measurements are made at two frequencies, $f_1$ and $f_2$, then, $$S(f_2) - S(f_1) = re^{-\gamma f_2}[1 - e^{-\gamma(f_1-f_2)}] \quad (16)$$

Since the frequency steps are uniform, then, $f_2 - f_1 = \Delta f$ and $$S(f_2) - S(f) = re^{-\gamma f_2}[1 - e^{\gamma\Delta f}] \quad (17)$$

Likewise, if measurements are made at the third frequency point, we have $$S(f_3) - S(f_2) = re^{-\gamma f_3}[1 - e^{\gamma\Delta f}] \quad (18)$$

We then have $$G = \frac{S(f_2) - S(f_1)}{S(f_3) - S(f_2)} = \frac{re^{-\gamma f_2}[1 - e^{\gamma\Delta f}]}{re^{-\gamma f_3}[1 - e^{\gamma\Delta f}]} = e^{\gamma(f_3-f_2)} = e^{\gamma\Delta f} \quad (19)$$

From which we get $$\alpha = \frac{\ln(|G|)}{\Delta f} \quad (20)$$

$$\tau = \frac{\angle G}{2\pi\Delta f} \quad (21)$$

$$r = \frac{S(f3) - S(f2)}{e^{-\gamma f3}[1 - e^{\gamma(f3-f2)}]} \quad (22)$$

and the remaining parameters $r_0$ and $\theta_0$ can be obtained using equation (10).

Note that the sector information is not relevant under this more precise approach.

It will be understood that this second approach obtains more precise curvature information for the spiral shape of a first plot comprising measured data at higher frequencies $f_1$, $f_2$, and $f_3$. However the second approach requires additional signal processing to determine the curvature of the spiral containing those multiple frequencies.

Spiral Extrapolation Process

Figure 5:
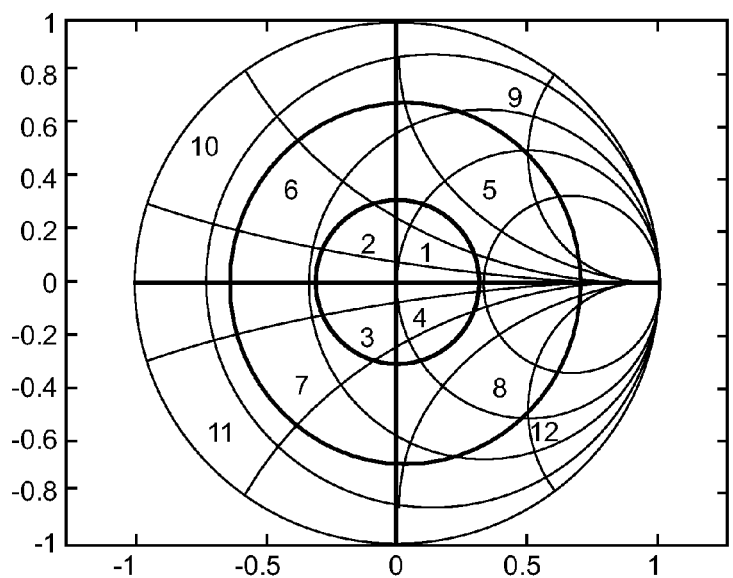
FIG. 5 is an illustrative drawing of a Smith Chart with N sectors in accordance with some embodiments of the invention.

FIG. 5 is an illustrative drawing of a Smith Chart with N sectors in accordance with some embodiments of the invention. In this example, N=12. Sectors are defined relative to the center of the |r|=1 circle in the complex reflection-coefficient plane. Sectors 1-4 are defined as the first through fourth quadrants of a first circle concentric with the |r|=1 circle and having a diameter of 1/3. Sectors 5-8 are defined as portions of the first through fourth quadrants of a second circle concentric with the |r|=1 circle and having a diameter of 2/3 that are disposed between the periphery of the first circle and the periphery of the second circle. Sectors 9-12 are defined as portions of the first through fourth quadrants of a third circle concentric with the |r|=1 circle and having a diameter of 3/3 that are disposed between the periphery of the second circle and a periphery of the third circle.

The process involves identifying the sector that has the frequency domain scattering data $P_1(x_1, y_1)$ for the lowest measured frequency. It is known that the DC point will be located someplace on the horizontal line through the |r|=1 circle. If the lowest measured frequency data point is located in one of sectors 1-4, then the DC point is presumed to be located at the center of the |r|=1 circle. If the lowest measured frequency data point is located in sector 5 or sector 8, then the DC point is presumed to be on the horizontal line through the |r|=1 circle and to the right between the (innermost) first circle and the (middle) second circle in FIG. 5. If the lowest measured frequency data point is located in sector 6 or sector 7, then the DC point is presumed to be on the horizontal line through the |r|=1 circle and to the left between the (innermost) first circle and the (middle) second circle in FIG. 5. If the lowest measured frequency data point is located in sector 9 or sector 12, then the DC point is presumed to be on the horizontal line through the |r|=1 circle to the right of (middle) second circle in FIG. 5. If the data point is located in sector 10 or sector 11, then the DC point is presumed to be on the horizontal line through the |r|=1 circle to the left of (middle) second circle in FIG. 5. It will be appreciated that the |r|=1 circle may be divided into more sectors to obtain finer resolution as to the predicted location of the DC point. The designation of sectors helps in making an estimate for the DC value.

If the approximated spiral extrapolation method is employed, then the lowest measured frequency point is used to determine α and τ based on equations (12) and (13). If $P_1(x_1, y_1)$ is in sectors 9-12, then we use equation (11) to determine the interpolated points from DC to $f_1$. If $P_1(x_1, y_1)$ is in one of the sectors 1-8, then we set all values from DC to $f_1$ equal to zero.

If the more precise spiral extrapolation method is employed, then equations (20) and (21) are used to extract α and τ. Next, equations (17) and (14) are used to calculate r and A. Finally, we use equation (10) to obtain an extrapolated second plot of points from DC to $f_1$.

It will be appreciated of course that a spiral extrapolation process in accordance with embodiments of the invention may be performed in a computer implemented environment. For example computer program code may be encoded in computer readable medium to cause a computer system to perform the approximated spiral extrapolation method or to perform the more precise spiral extrapolation method. Measured scattering parameter data values for actual passive devices or a network of passive devices, that are part of a first plot from which a spiral curve is extrapolated, may be obtained by a measurement tool such as a network analyzer, for example, and may be temporarily stored in a file encoded in computer readable medium for subsequent processing according to such computer program code. Predicted scattering parameter values of a second plot for the passive device or network, that is extrapolated from the first plot may be output according to such computer program code, and saved to a file encoded in a computer readable medium. The measured data from the first plot and the predicted data from the second plot together constitute a frequency domain signature of a network that may be converted through signal processing techniques, such as the IFT for example, to produce time domain information characteristics of the passive device or network.

Example 1

Figure 6A:
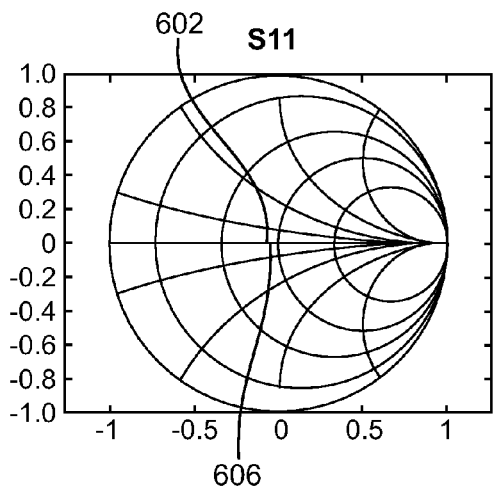
FIGS. 6A-6B are illustrative graphical representations of Smith Chart plots of S11 and S21 frequency signature traces respectively, for a two-port device.
Figure 6B:
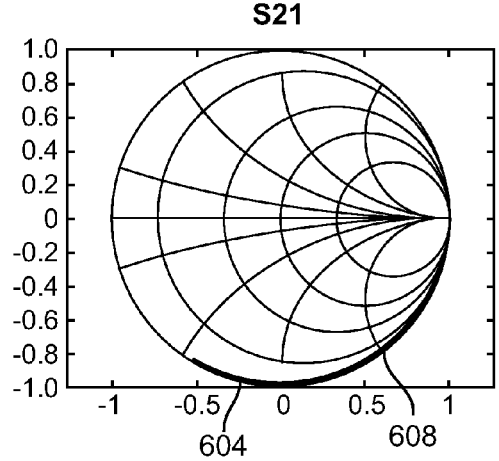

FIGS. 6A-6B are illustrative graphical representations of Smith Chart plots of S11 and S21 frequency signature traces respectively, for a microstrip transmission line. The S11 plot represents a reflection coefficient at port 1 of the transmission line. The S21 plot represents a transmission ratio from port 1 of the transmission line to port 2 of the transmission line. The solid lines 602, 604 designate first plots comprising measured scattering parameter data. The dashed lines 606, 608 designate second plots comprising extrapolated scattering parameter data using the approximated method. The scattering parameters in this example were obtained via measurements on a network analyzer.

Figure 7A:
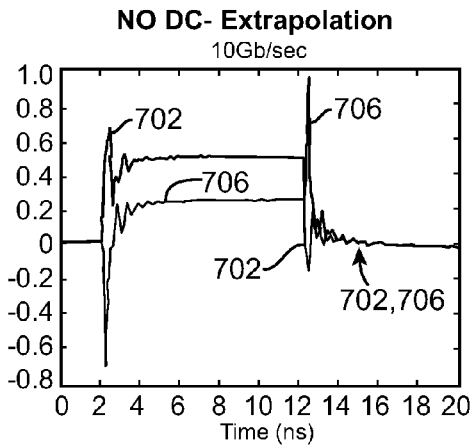
FIGS. 7A-7B are illustrative time domain transient simulation results corresponding to the frequency domain traces of FIGS. 6A-6B.
Figure 7B:
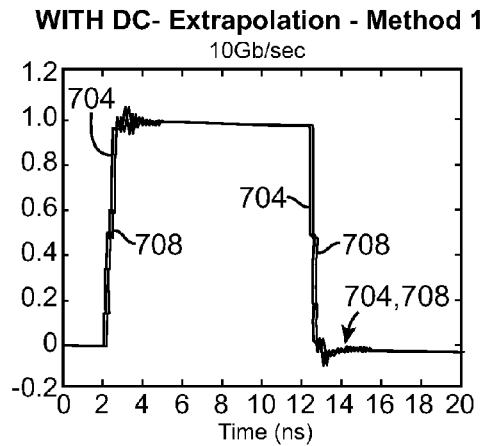

FIGS. 7A-7B are illustrative time domain transient simulation results corresponding to the frequency domain traces of FIGS. 6A-6B, respectively. The first traces 702, 704 and the second traces 706, 708 correspond to the sending and receiving ends of the transmission line respectively. The no DC extrapolation result of FIG. 7A shows distorted waveforms that do not settle to a discernable value. The result using a DC extrapolation result in accordance with an embodiment of the invention of FIG. 7B more clearly indicates the shape and settled values of the time domain signal.

Example 2

Figure 8A:
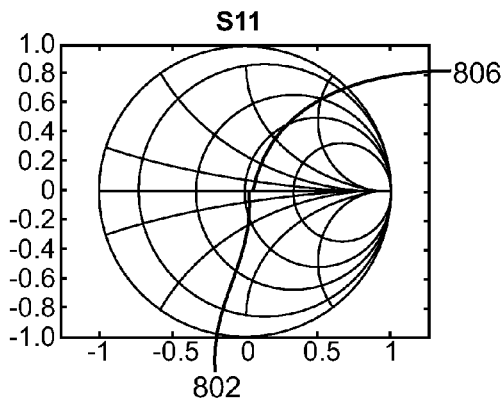
FIGS. 8A-8B are illustrative graphical representations of Smith Chart plots of S11 and S21 frequency signature traces respectively, for a two-port device.
Figure 8B:
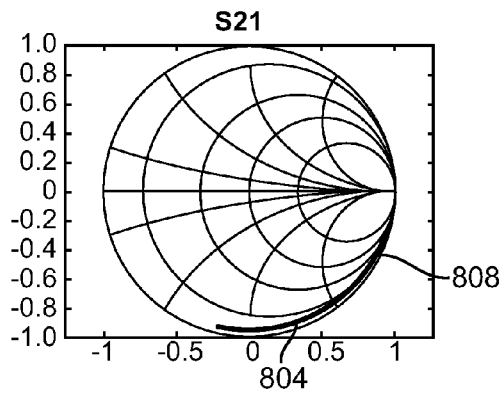

FIGS. 8A-8B are illustrative graphical representations of Smith Chart plots of S11 and S21 frequency signature traces respectively, for I/O channel trace. The solid lines 802, 804 designate first plots comprising measured scattering parameter data. The dashed lines 806, 808 designate second plots comprising extrapolated scattering parameter data using the approximated method. The data in this example were generated using a field solver.

Figure 9A:
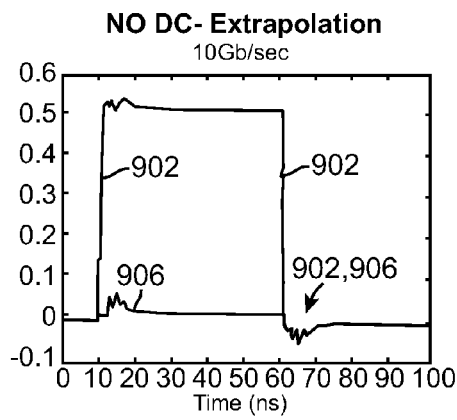
FIGS. 9A-9B are illustrative time domain transient simulation results corresponding to the frequency domain traces of FIGS. 8A-8B.
Figure 9B:
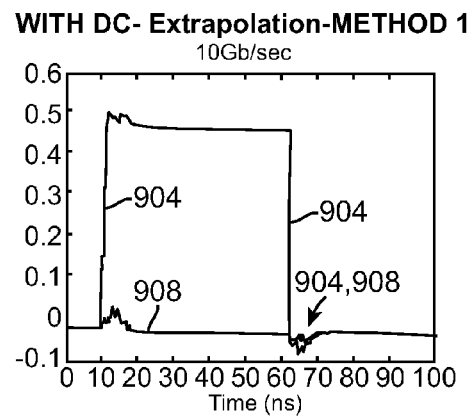

FIGS. 9A-9B are illustrative time domain transient simulation results corresponding to the frequency domain traces of FIGS. 8A-8B, respectively. The first traces 902, 904 and the second traces 906, 908 correspond to the sending and receiving end of the I/O channel, respectively. The no DC extrapolation result in FIG. 9A shows that the smaller crosstalk waveform does not settle to zero. The result using a DC extrapolation result in accordance with an embodiment of the invention in FIG. 9B shows the smaller waveform settling to zero.

Example 3

Figure 10A:
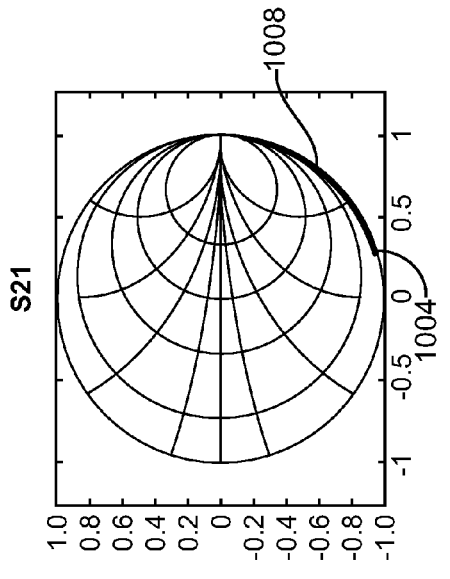
FIGS. 10A-10B are illustrative graphical representations of Smith Chart plots of S11 and S21 frequency signature traces respectively, for a two-port device.
Figure 10B:
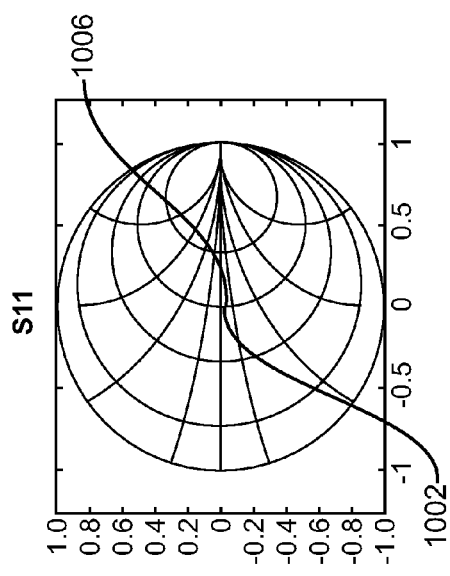

FIGS. 10A-10B are illustrative graphical representations of Smith Chart plots of S11 and S21 frequency signature traces respectively, for microstrip line. The solid lines 1002, 1004 designate first plots comprising measured scattering parameter data. The dashed lines 1006, 1008 designate second plots comprising extrapolated scattering parameter data using the approximated method. The measurements in this example were obtained from a network analyzer.

Figure 11A:
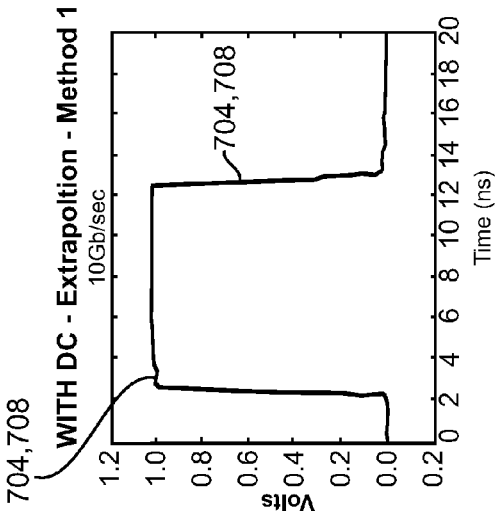
FIGS. 11A-11B are illustrative time domain transient simulation results corresponding to the frequency domain traces of FIGS. 10A-10B.
Figure 11B:
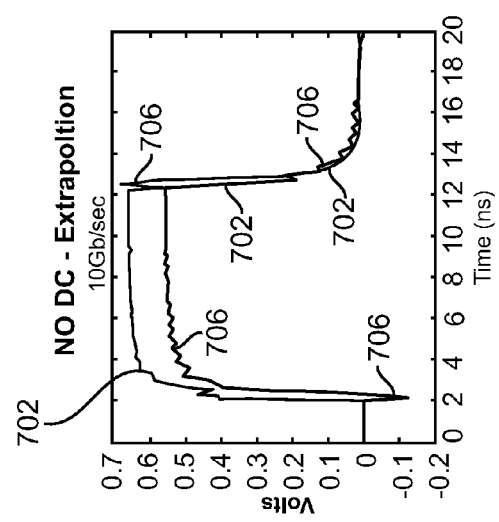

FIGS. 11A-11B are illustrative time domain transient simulation results corresponding to the frequency domain traces of FIGS. 10A-10B, respectively. The first traces 1102, 1104 and the second traces 1106, 1108 correspond to the sending and receiving end of the microstrip line, respectively. The no DC extrapolation result in FIG. 11A shows that the rising and falling edges of the two waveforms are not sharp and that the falling edge never reaches zero. The result using a DC extrapolation result in accordance with an embodiment of the invention in FIG. 11B shows waveforms with sharp rising and falling edges and that swing cleanly between 1.0 volts and 0 volts.

It will be understood that in the above Examples 1-3, extrapolations may have been performed for all four scattering parameters, S11, S21, S12 and S22, but for sake of simplifying the explanation and drawings, only two are shown for this example. Also, a signal processing technique such as IFT may be used to produce the time domain values in FIGS. 7A-7B, 9A-9B and 11A-11B from the frequency domain signatures of FIGS. 6A-6B, 8A-8B and 10A-10B.

Example 4

Figure 12:
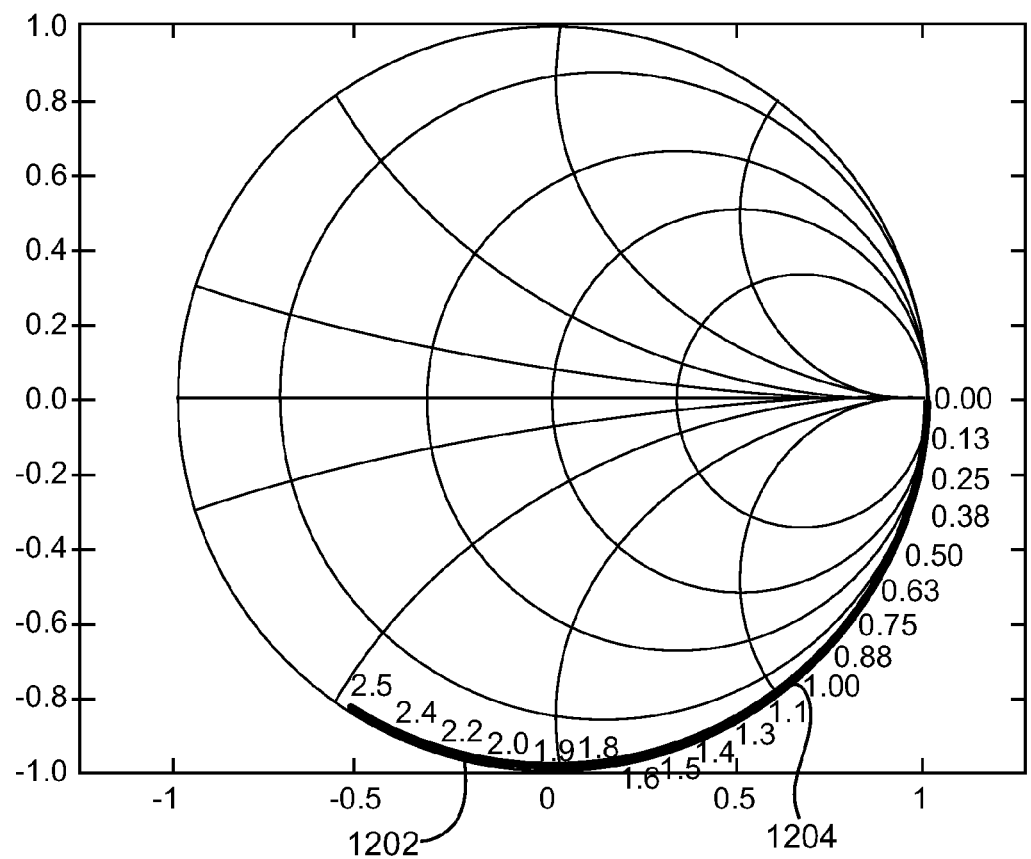
FIG. 12 is an illustrative graphical representation of Smith Chart plot of a frequency signature trace for a two-port device. in which frequency values are labeled.

FIG. 12 is an illustrative graphical display of a Smith Chart plot of a frequency signature trace for the microstrip line of example 1 in which frequency values are labeled. Note that frequency values decrease in the counter-clockwise direction. The solid line 1202 designates a first plot comprising measured scattering parameter data. The dashed line 1204 designate a second plot comprising extrapolated scattering parameter data in accordance with an embodiment of the invention. Table 1 sets forth Smith Chart data representing values for real and imaginary components of scattering data and corresponding frequencies for the trace of FIG. 12. In Table 1, first data values were measured for frequencies of 2.0 GHz and above, and second data values were extrapolated for frequencies below 2.0 GHz.

TABLE 1

| Frequency (GHz) | Real | Imaginary |
|---|---|---|
| 0 | 1 | 0 |
| 0.1250 | 0.9937 | −0.1048 |
| 0.2500 | 0.9766 | −0.2082 |
| 0.3750 | 0.9486 | −0.3092 |
| 0.5000 | 0.9103 | −0.4066 |
| 0.6250 | 0.8620 | −0.4994 |
| 0.7500 | 0.8043 | −0.5866 |
| 0.8750 | 0.7378 | −0.6672 |
| 1.0 | 0.6633 | −0.7403 |
| 1.1250 | 0.5816 | −0.8052 |
| 1.2500 | 0.4936 | −0.8611 |
| 1.3750 | 0.4003 | −0.9074 |
| 1.5000 | 0.3028 | −0.9436 |
| 1.6250 | 0.2020 | −0.9694 |
| 1.7500 | 0.0992 | −0.9845 |
| 1.8750 | −0.0045 | −0.9888 |
| 2.00000 | −0.12183 | −0.97675 |
| 2.06000 | −0.15894 | −0.96866 |
| 2.12000 | −0.21460 | −0.95657 |
| 2.18000 | −0.26376 | −0.94312 |
| 2.24000 | −0.30972 | −0.92725 |
| 2.30000 | −0.35941 | −0.91064 |
| 2.36000 | −0.39594 | −0.89169 |

TABLE 1-continued

| Frequency (GHz) | Real | Imaginary |
|---|---|---|
| 2.42000 | −0.43658 | −0.86771 |
| 2.48000 | −0.48495 | −0.84323 |
| 2.54000 | −0.53497 | −0.81256 |
| 2.60000 | −0.57520 | −0.78137 |
| 2.66000 | −0.61215 | −0.76050 |
| 2.72000 | −0.65408 | −0.72491 |
| 2.78000 | −0.69537 | −0.69617 |

Figure 13:
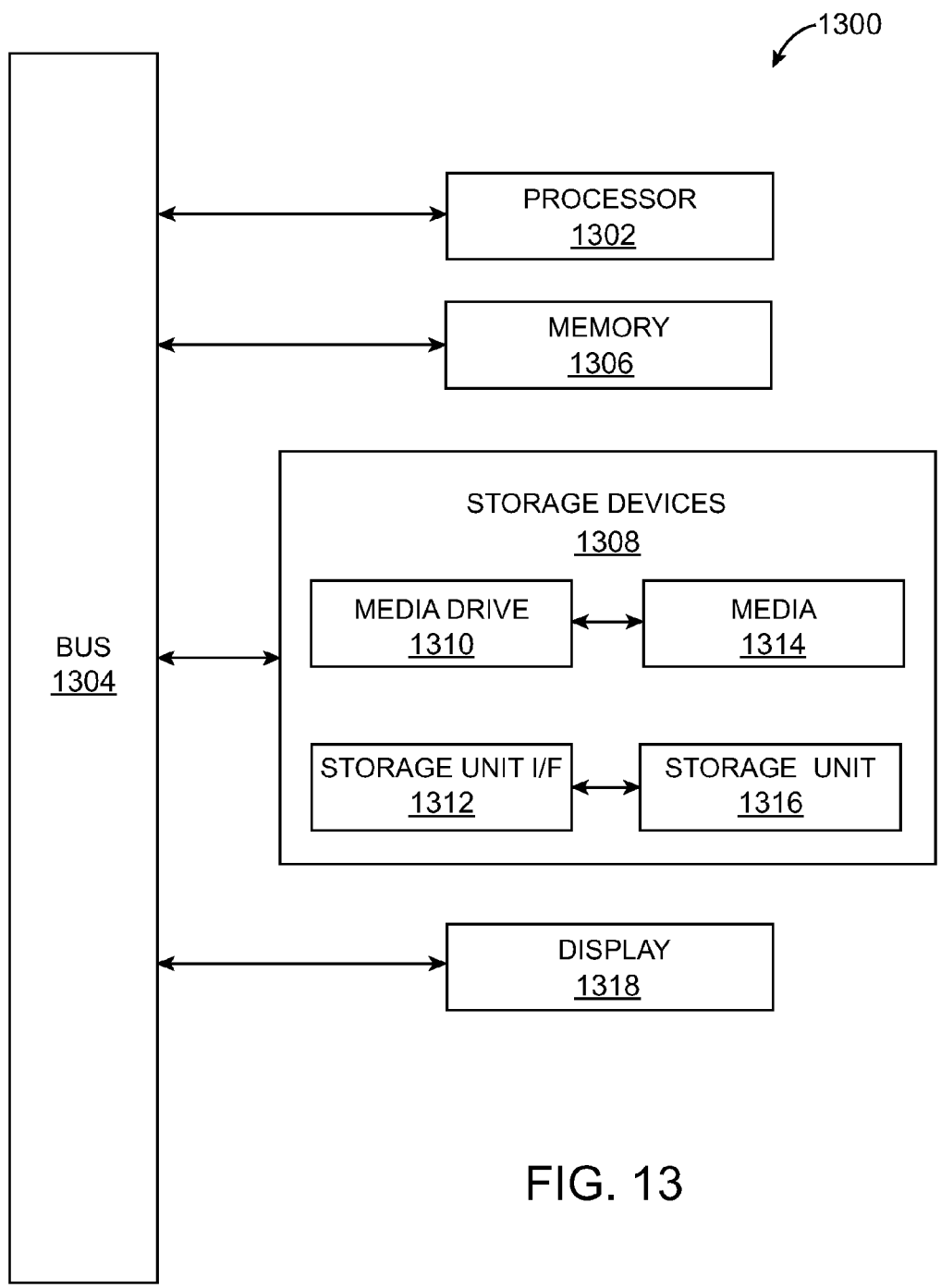
FIG. 13 is an illustrative block diagram representation of a computer system suitable for implementing embodiments of the invention.

FIG. 13 is a block diagram of an illustrative computing system 1300 suitable for implementing some embodiments of the present invention. Computer system 1300 includes a bus 1306 or other communication mechanism for communicating information, which interconnects subsystems and devices, such as processor 1307, system memory 908 (e.g., RAM), static storage device 1309 (e.g., ROM), disk drive 1310 (e.g., magnetic or optical), communication interface (e.g., modem or Ethernet card), display 1311 (e.g., CRT or LCD), input device 1312 (e.g., keyboard), and cursor control.

According to one embodiment of the invention, computer system 1300 performs specific operations by processor 1307 executing one or more sequences of one or more instructions encoded in system memory 1308. Operations may include, for example, processing involved with the approximated spiral extrapolation method such as using a select lowest frequency point to determine α and τ using equations (12) and (13). Alternatively, processing may involve the more precise spiral extrapolation method such as determining values for α and τ using equations (20) and (21); and using equations (17) and (14) to calculate r and A. Equation (10) is used to obtain an extrapolated second plot of points. The instructions thereby can be used to extrapolate from a Smith Chart representation of first measured coefficients corresponding to higher frequency signals, a spiral path that includes predicted coefficients for lower frequency voltage signals. Such instructions may be read into system memory 1308 from another computer readable/usable medium, such as static storage device 1309 or disk drive 1310. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The computer system 1300 also includes a display unit 1318 that can be used to display information such as Smith Charts. Moreover, the display unit can be used to display other information relating to mismatch between a source impedance of a network and a load impedance.

The term "computer readable medium" or "computer usable medium" as used herein refers to any medium that participates in providing and for storing an information structure or for providing an information structure or instructions to processor 1307 for execution. Such a medium may take many forms, including but not limited to, non-volatile media, volatile media, and transmission media. Non-volatile media includes, for example, optical or magnetic disks, such as disk drive 1310. Volatile media includes dynamic memory, such as system memory 1308. Transmission media includes coaxial cables, copper wire, and fiber optics, including wires that comprise bus 1306. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read. Coefficients representing measured mismatch corresponding to for higher frequency signals may be stored in such media. Likewise, coefficients representing predicted mismatch also may be stored in such media.

In an embodiment of the invention, execution of a sequences of instructions to is performed by a single computer system 1300. According to other embodiments of the invention, two or more computer systems 1300 coupled by communication link 1315 (e.g., LAN, PTSN, or wireless network) may perform the sequence of instructions required to practice the invention in coordination with one another.

Computer system 1300 may transmit and receive messages, data, and instructions, including program, i.e., application code, through communication link 1315 and communication interface. Received program code may be executed by processor 1307 as it is received, and/or stored in disk drive 1310, or other non-volatile storage for later execution.

The foregoing description and drawings of preferred embodiments in accordance with the present invention are merely illustrative of the principles of the invention. For example, although drawings are included that visually portray first measured and second predicted plots on a Smith Chart, the invention can be practiced without an actual Smith Chart display, in which case computations can be performed internal to a computer system so as to produce a representation of a Smith Chart trace analogous to that of Table 1 without actually showing the Smith Chart used to produce it, for example. Thus, various modifications can be made to the embodiments by those skilled in the art without departing from the spirit and scope of the invention, which is defined in the appended claims.

The invention claimed is:

1. A method to use a Smith Chart technique to obtain frequency domain network performance information corresponding to a passive network including one or more passive devices comprising:
receiving first data representing a first Smith Chart plot of coefficients representing measured mismatch between a source impedance of a network and a load impedance of the network for higher frequency signals; and
using a computer for extrapolating a predicted substantially spiral shaped second Smith Chart plot of coefficients based upon the first data, which includes a coefficient representing predicted mismatch between the source impedance of the network and the load impedance of the network for one or more lower frequency signals.

2. The method of claim 1 where in,
the first plot includes reflection coefficients.

3. The method of claim 1 wherein,
the first plot includes transmission coefficients.

4. The method of claim 1 wherein,
the first plot includes a first complex coefficient; and
the second plot includes a second complex coefficient.

5. The method of claim 1 wherein,
the first plot includes multiple coefficients each representing measured mismatch between the source impedance of the network and the load impedance of the network determined from one or more measurements of a corresponding different one of multiple higher frequency voltage signals on the network; and
the second plot includes multiple coefficients each representing predicted mismatch between the source impedance of the network and the load impedance of the network predicted to result from a corresponding different lower frequency voltage signal on the network.

6. The method of claim 1 wherein,
the first plot includes multiple complex coefficients; and
the second plot includes multiple complex coefficients.

7. The method of claim 1 wherein,
the at least a portion of the spiral path extends to a region of the Smith Chart representing zero reactance.

8. The method of claim 1 wherein,
the at least a portion of the spiral path extends in a counter-clockwise direction from the first plot to the second plot.

9. The method of claim 1 further including:
exciting the network with a higher frequency voltage signal; and
measuring impedance mismatch on the network resulting from such excitation.

10. The method of claim 1 further including:
for a voltage signal at each of multiple higher frequencies, exciting the network with the higher frequency signal;
measuring a voltage signal incident upon the network source resulting from such excitation; and
measuring a voltage reflected from the network load resulting from such excitation.

11. The method of claim 1 wherein,
extrapolating includes extrapolating the second plot from the first plot.

12. The method of claim 1 wherein,
the second plot includes multiple coefficients each representing predicted mismatch between source impedance of the network and load impedance of the network predicted to result from a corresponding different lower frequency voltage signal on the network; and
extrapolating includes extrapolating the second plot from the first plot.

13. The method of claim 1 wherein,
the second plot includes multiple coefficients each representing predicted mismatch between source impedance of the network and load impedance of the network predicted to result from a corresponding different lower frequency voltage signal on the network; and
extrapolating includes calculating the second plot based upon a single coefficient of the first plot.

14. The method of claim 13 wherein,
calculating includes using the substantially the following formulation, $$S(f)=e^{\pm f\alpha}e^{-j2\pi f\tau}.$$

$$a = \pm \frac{\ln(|S(f_1)|)}{f_1}$$

$$\tau = -\frac{\angle S(f)}{2\pi f_1}.$$

15. The method of claim 1 wherein,
the first plot includes multiple coefficients each representing mismatch between the source impedance of the network and the load impedance of the network determined from one or more measurements of a corresponding different one of multiple higher frequency voltage signals on the network;

the second plot includes multiple coefficients each representing mismatch between the source impedance of the network and the load impedance of the network predicted to result from a corresponding different lower frequency voltage signal on the network; and extrapolating includes calculating the second plot based upon more than one coefficient of the first plot.

16. The method of claim 15 wherein, calculating includes using substantially the following formulation, $$\tilde{S}(f) = r_0 e^{j\theta} + r e^{\pm f\alpha} e^{-j2\pi f\tau} = S_0 + S(f).$$

$$a = \pm \frac{\ln(|S(f_1)|)}{f_1}$$

$$\tau = -\frac{\angle S(f)}{2\pi f_1}.$$

17. The method of claim 1 wherein extrapolating on the Smith Chart includes:

determining shape of a spiral based upon the measured first plot; and predicting the second plot based upon the determined spiral shape.

18. The method of claim 1 wherein, extrapolating on the Smith Chart includes:

predicting location on the Smith Chart of a DC coefficient;

determining shape of a spiral based upon the measured first plot; and predicting the second plot based upon the determined spiral shape and the predicted location of the DC coefficient.

19. The method of claim 1 further including:

indicating the first plot on a graphical display of a Smith Chart.

20. The method of claim 1 further including:

indicating the first plot on a graphical display of a Smith Chart; and indicating the second plot on a graphical display of a Smith Chart.

21. The method of claim 1 further including:

converting a frequency domain signature represented by at least a portion of the first and second plots to time domain information.

22. An article of manufacture including computer readable medium encoded with computer readable code for performing the method of claim 1.

23. A system including a processor, storage medium and communications bus coupling the processor and the storage medium wherein the storage medium is encoded to cause the processor to cause performance of the method of claim 1.

* * * * *

UNITED STATES PATENT AND TRADEMARK OFFICE
CERTIFICATE OF CORRECTION

| | | |
|---|---|---|
| PATENT NO. | : 8,056,034 B1 | Page 1 of 1 |
| APPLICATION NO. | : 12/016151 | |
| DATED | : November 8, 2011 | |
| INVENTOR(S) | : Jose Schutt-Aine et al. | |

It is certified that error appears in the above-identified patent and that said Letters Patent is hereby corrected as shown below:

In column 4, line 46, delete "effect" and insert -- effect. --, therefor.

In column 4, line 49, delete "frequency" and insert -- frequency. --, therefor.

In column 8, line 44, delete " $S(f_3)-S(f_2)=re^{-j\beta}[1-e^{\gamma\Delta f}]$ ," and insert -- $S(f_3)-S(f_2)=re^{-j\beta}[1-e^{\gamma\Delta f}]$ --, therefor.

In column 13, line 56, in Claim 2, delete "where in," and insert -- wherein, --, therefor.

In column 14, line 53, in Claim 14, after " $S(f)=e^{-j\alpha}e^{-j2\pi f\tau}$ " delete ".".

In column 15, line 12, in Claim 16, after " $\tilde{S}(f)=r_0 e^{j\theta}+re^{-j\alpha}e^{-j2\pi f\tau}=S_0+S(f)$ " delete ".".

Signed and Sealed this
Eleventh Day of September, 2012

David J. Kappos
*Director of the United States Patent and Trademark Office*